US 8,995,498 B2

(12) United States Patent
Yu et al.

(10) Patent No.: US 8,995,498 B2
(45) Date of Patent: Mar. 31, 2015

(54) APPARATUS AND METHOD FOR TWO-STAGE LINEAR/NONLINEAR INTERFERENCE CANCELLATION

(75) Inventors: Yingqun Yu, San Diego, CA (US); Farrokh Abrishamkar, San Diego, CA (US); Wenjun Li, San Diego, CA (US); Andrew K. Kan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 12/906,328

(22) Filed: Oct. 18, 2010

(65) Prior Publication Data

US 2012/0093269 A1 Apr. 19, 2012

(51) Int. Cl.
*H04B 1/00* (2006.01)
*H04B 1/7107* (2011.01)
*H04B 1/7105* (2011.01)
*H04J 11/00* (2006.01)

(52) U.S. Cl.
CPC .......... *H04B 1/7107* (2013.01); *H04B 1/71052* (2013.01); *H04J 11/0046* (2013.01); *H04J 11/0056* (2013.01)
USPC ........................................................ 375/148

(58) Field of Classification Search
CPC .............. H04B 1/71052; H04B 1/7107; H04J 11/0056; H04J 11/0046
USPC ......... 375/144, 148, 232, 260, 267, 295, 329, 375/340, 346, 347, 350
See application file for complete search history.

(56) References Cited

U.S. PATENT DOCUMENTS

| | | | |
|---|---|---|---|
| 2003/0035469 A1* | 2/2003 | Frank et al. | 375/150 |
| 2004/0123227 A1* | 6/2004 | Lee et al. | 714/792 |
| 2005/0249269 A1* | 11/2005 | Tomasin et al. | 375/148 |
| 2007/0110131 A1* | 5/2007 | Guess et al. | 375/148 |
| 2007/0110134 A1* | 5/2007 | Guess et al. | 375/148 |
| 2007/0116099 A1 | 5/2007 | Banister et al. | |
| 2011/0065441 A1* | 3/2011 | Hahm | 455/450 |
| 2011/0292974 A1* | 12/2011 | Lamba et al. | 375/148 |

FOREIGN PATENT DOCUMENTS

WO 2010129436 A1 11/2010

OTHER PUBLICATIONS

International Search Report and Written Opinion—PCT/US2011/056726—ISA/EPO—Feb. 16, 2012.

\* cited by examiner

*Primary Examiner* — Syed Haider
(74) *Attorney, Agent, or Firm* — Linda G. Gunderson (57) ABSTRACT

An apparatus and method for a two-stage linear/nonlinear interference cancellation comprising processing a receive signal to produce a first descrambled signal; and processing the first descrambled signal to produce a detected signal. In one aspect, a first interference canceller module is used for processing the received signal and a second interference canceller module is used for processing the first descrambled signal. In one aspect, the first interference canceller is a linear interference canceller (IC) and the second interference canceller is a linear/nonlinear interference canceller (IC).

32 Claims, 9 Drawing Sheets

… some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Figure 1:
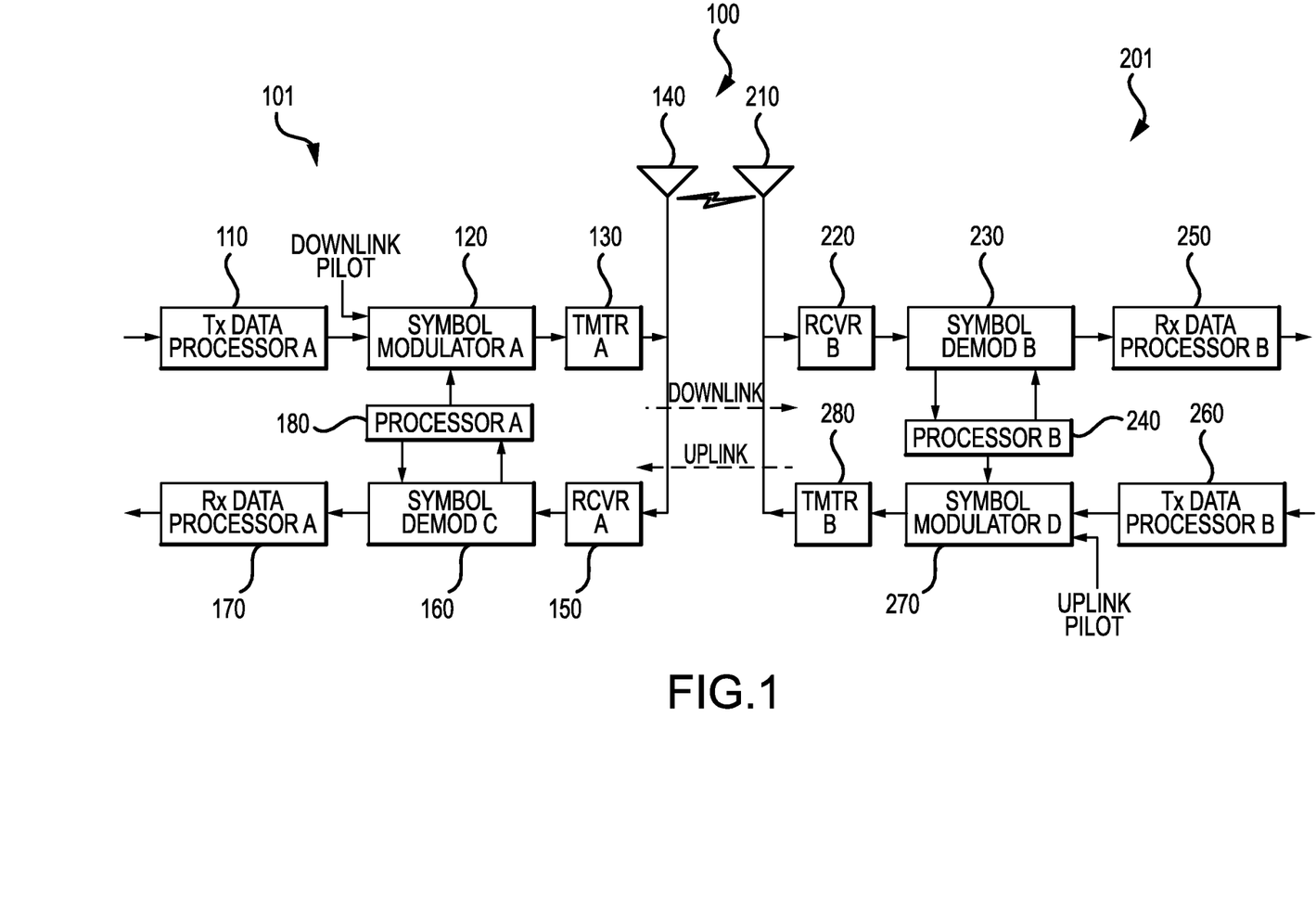

FIG. 1 is a block diagram illustrating an example access node/user equipment (UE) system 100. One skilled in the art would understand that the example access node/UE system 100 illustrated in FIG. 1 may be implemented in a frequency division multiple access (FDMA) environment, an orthogonal frequency division multiple access (OFDMA) environment, a code division multiple access (CDMA) environment, a wideband code division multiple access (WCDMA) environment, a time division (TDMA) environment, a spatial division multiple access (SDMA) environment, or any other suitable wireless environment.

The access node/UE system 100 includes an access node 101 (e.g., base station) and a user equipment or UE 201 (e.g., wireless communication device or mobile station). In the downlink leg, the access node 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
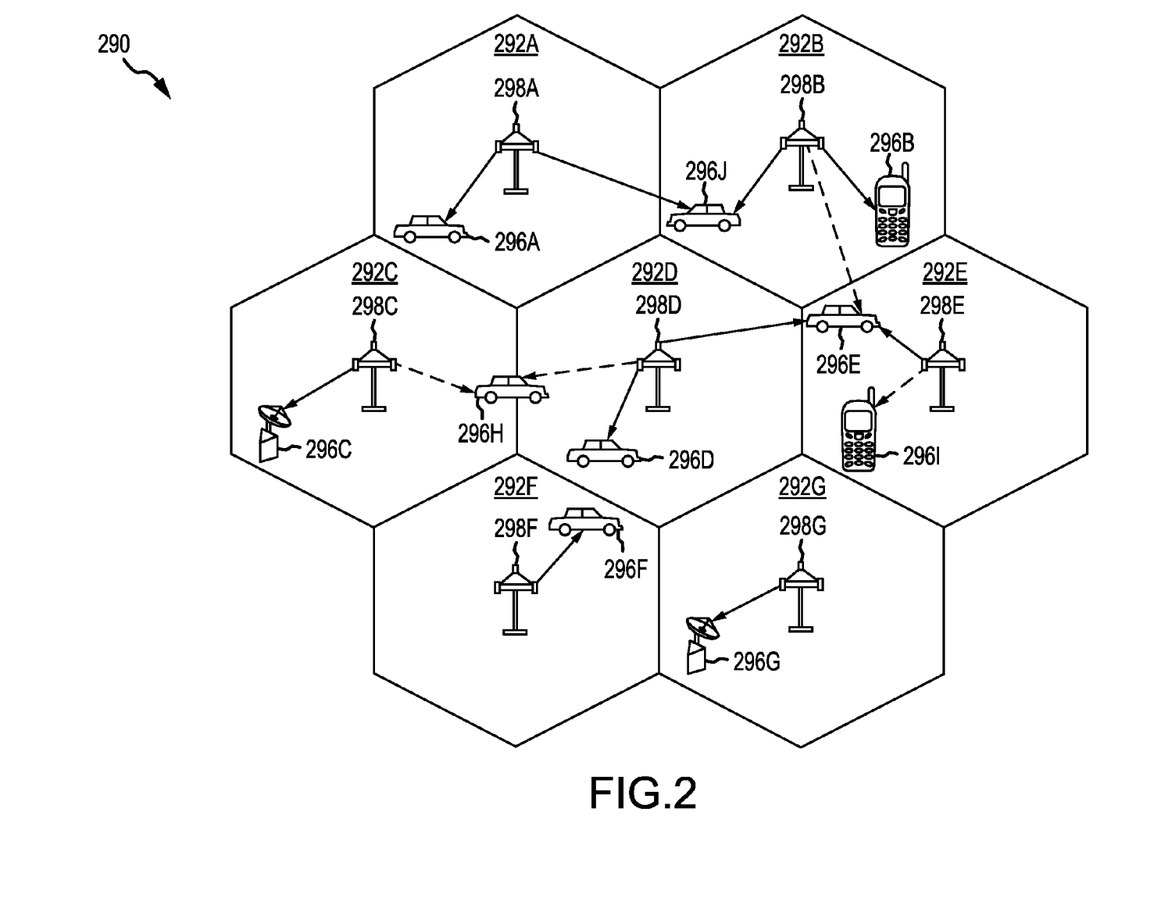

FIG. 2 illustrates an example of a wireless communications system 290 that supports a plurality of users. In FIG. 2, reference numerals 292A to 292G refer to cells, reference numerals 298A to 298G refer to base stations (BS) or base transceiver station (BTS) and reference numerals 296A to 296J refer to access User Equipments (UE). Cell size may vary. Any of a variety of algorithms and methods may be used to schedule transmissions in system 290. System 290 provides communication for a number of cells 292A through 292G, each of which is serviced by a corresponding base station 298A through 298G, respectively.

Figure 3:
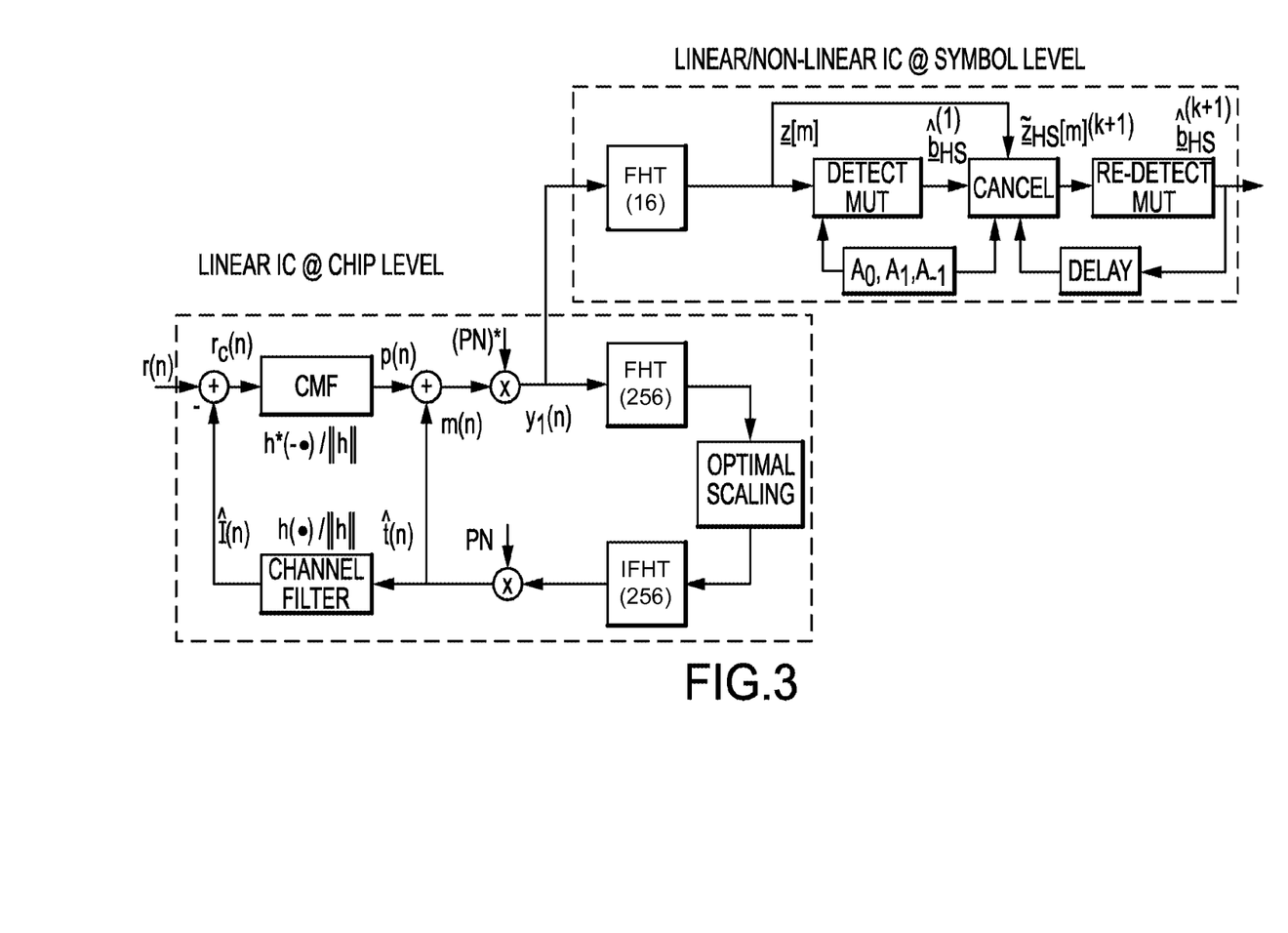

FIG. 3 illustrates an example of an overview of a two-stage linear/nonlinear interference cancellation processor. In one aspect, the interference cancellation processor comprises two stages: a first interference canceller which operates at a chip level and a second interference canceller which operates at a symbol level. In one example, the first interference canceller operates as a linear interference canceller at the chip level. In one aspect, the first interference canceller provides iterative inter-cell and intra-cell interference cancellation for all cells. In another aspect, it provides high gains when at cell edge, for example, at low geometry, and it provides moderate gains when at cell center, for example, at high geometry. Although illustrated for a single cell, the first interference canceller may be performed for multiple serving and/or interfering cells in a serial or parallel fashion.

In another example, the second interference canceller operates as a linear/nonlinear interference canceller at the symbol level. In one aspect, the second interference canceller provides iterative intra-cell interference cancellation for a target cell only. In another aspect, it provides high gains when close to the cell center, for example, at high geometry.

In one aspect, a receive signal r(n) is modeled as a convolution of a transmit signal x(n) and a channel impulse response h(n):

$$r(n)=x(n)*h(n)$$

As shown in FIG. 3, the receive signal r(n) serves as an input to the first interference canceller where it is subtracted by an estimated interference signal Î(n) to generate a cancelled received signal $r_c$(n). The cancelled received signal $r_c$(n) is then filtered by a channel matched filter (CMF) with transfer function given by:

$$h^*(-\cdot)/\|h\|.$$

In one example, the CMF can be a general channel equalizer such as a minimum-mean-squared-error (MMSE) equalizer.

The CMF output is denoted as p(n) and is added to a first estimated transmit signal t̂(n) to generate a modified filtered signal m(n). The modified filtered signal m(n) is then descrambled by multiplying with a conjugate pseudonoise sequence of a given cell denoted as (PN)* to yield a first descrambled signal $y_1$(n). The first descrambled signal $y_1$(n) is next sent to a first 256 point fast Hadamard transform (FHT) module to yield a first despread signal for all OSVF codes. The first despread signal for all OSVF codes is then processed by an optimal scaling module to yield a first scaled symbol signal for all OSVF codes. The first scaled symbol signal for all OSVF codes is next sent to a 256 point inverse fast Hadamard transform (IFHT) module to yield a first spread output signal. The first spread output signal is next scrambled by multiplying with a pseudonoise sequence of a given cell denoted as PN to yield the first estimated transmit signal t̂(n). The first estimated transmit signal t̂(n) is supplied to a channel filter with transfer function given by:

$$h^*(\cdot)/\|h\|.$$

In one aspect, an FHT is used to obtain the despread signals for all OVSF codes, from which symbol estimation can be performed. In another aspect, an optimal scaling module, or symbol estimator, applies a scale on each OVSF code to obtain estimates of symbols. In one example, the optimal scaling module may be based on a given criterion, such as minimum-mean-squared error (MMSE) or quasi-linear interference cancellation (QLIC).

The output of the channel filter is denoted as the estimated interference signal $\hat{I}(n)$ mentioned above. In one aspect, the first stage chip-level interference cancellation may be iterated several times to obtain a cleaner cancelled signal before being supplied to the second stage. In one example, the last iteration is performed on the serving cell, and the signal, obtained after adding back estimated serving cell transmit signal $\hat{t}(n)$, is sent to the second stage for symbol level interference cancellation within the serving cell.

In another aspect, the first descrambled signal $y_1(n)$ serves as an input to the second interference canceller. In one example, the first descrambled signal $y_1(n)$ is sent to a second 16 point fast Hadamard transform (FHT) module to yield a second despread symbol $z(n)$. The second despread symbol $z(n)$ is sent to a detect multi-user transmission (MUT) module to yield a detected signal $b(n)$. The detected signal $b(n)$ is sent to a cancel module to generate a cancelled symbol $z(n)$. In one example, the cancel module also receives the second despread symbol $z(n)$. In another example, a matrix module generates three matrices, $A_0, A_1, A_{-1}$ which are used by the detect MUT module and the cancel module to generate the cancelled symbol $z(n)$. The cancelled symbol $z(n)$ is then sent to a re-detect MUT module to generate a second detected symbol $b^{(2)}$. The second detected symbol $b^{(2)}$ is also sent to a delay module to generate a delayed output signal. In one example, the cancel module also receives the delayed output signal. In another example, the symbol-level re-detect MUT module and re-cancel process may be iterated several times to yield a refined symbol estimate. According to certain aspects, $A_{-1}$ $A_0$, $A_1$, are $N_u \times N_u$ multi-user interference (MUI) and shoulder matrices, where $N_u$ is the number of code channels in a serving cell. In one aspect, the multi-user interference matrix $A_0$ is a $N_u \times N_u$ matrix that relates each received symbol $z_1(m)$ to $z_{Nu}(m)$ to the corresponding user symbol and to the other user symbols. For example, for received symbol $z_1(m)$, coefficient $[A_0(m)]$ 1, 1 of the multi-user interference matrix $A_0(m)$ relates the received symbol $z_1(m)$ to the corresponding user symbol $b_1(m)$. In addition, the other coefficients $[A_0(m)]$ 1, 2 to $[A_0(m)]$ 1, $N_u$ in the first row of the multi-user interference matrix $A_0(m)$ relate the received symbol $z_1(m)$ to the other user symbols $b_2(m)$ to $b_{Nu}(m)$, respectively. The same relationship applies to the other received symbols.

Figure 4:
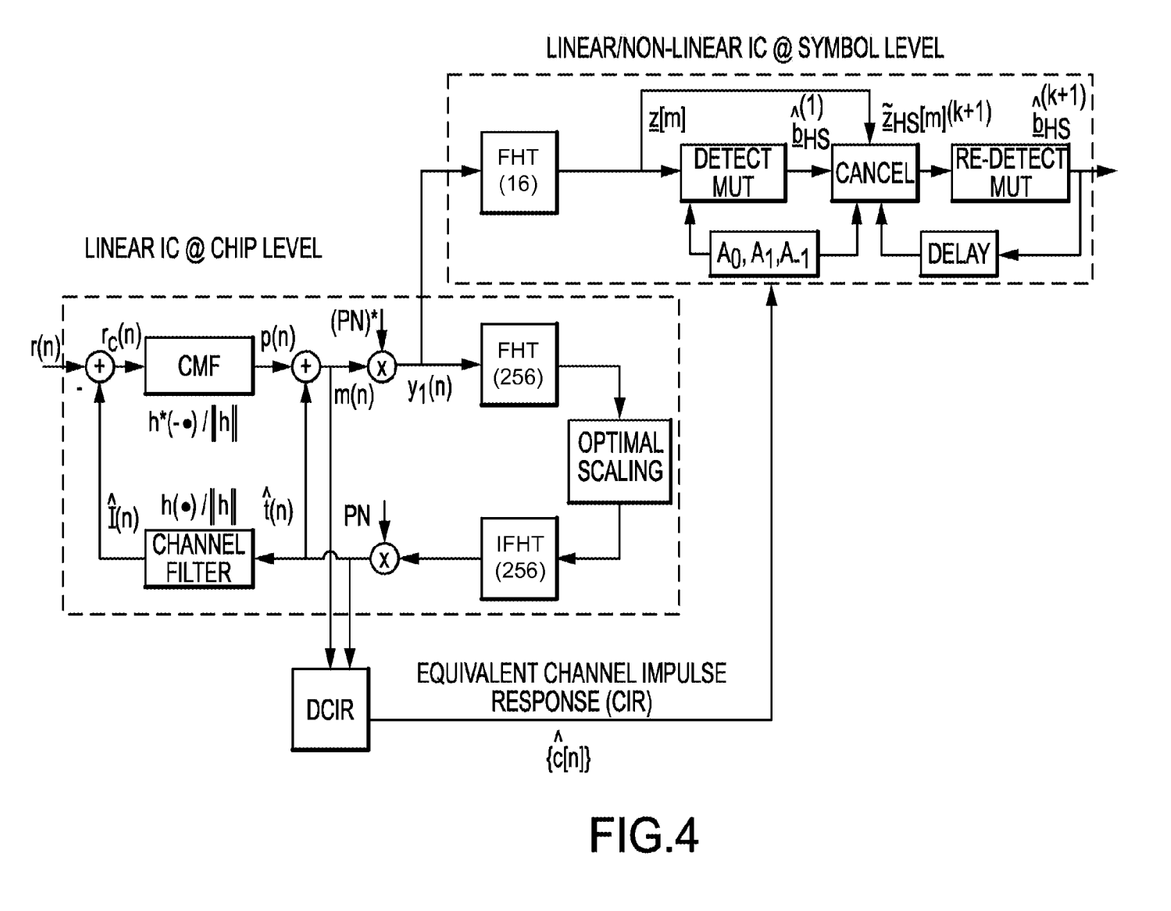

FIG. 4 illustrates an example of a data-aided channel impulse response (CIR) estimation module. In one example, CIR estimation using only pilots may not be sufficient for symbol-level interference cancellation. In one aspect, pilot and traffic estimates may provide a better estimate of the CIR than using the pilots alone.

In one example, as shown in FIG. 4, the modified filtered signal $m(n)$ and the first estimated transmit signal $\hat{t}(n)$ are sent to a data-aided CIR estimation module to produce an equivalent channel input response $\{c[n]\}$ which is sent to the coefficient module within the second interference canceller.

Figure 5:
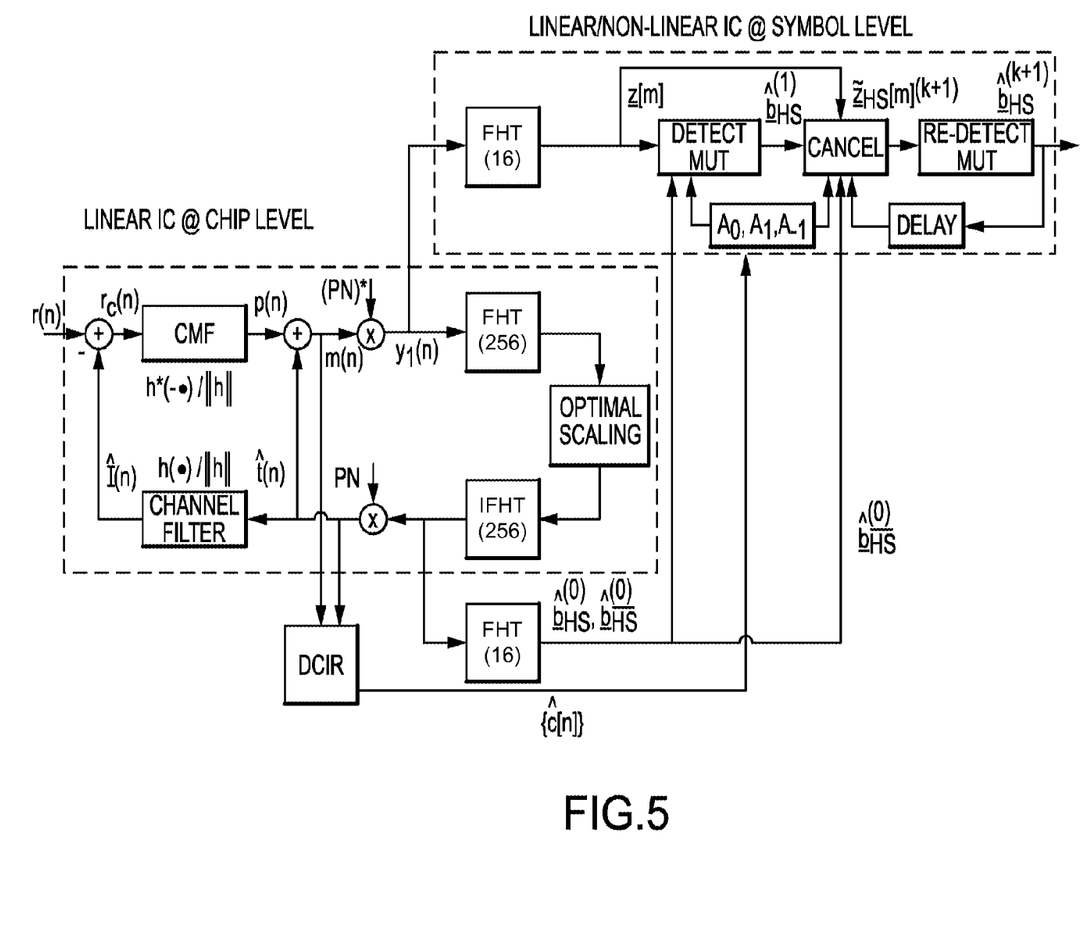

FIG. 5 illustrates an example of a linear decision aided symbol level interference canceller. In one example, the first interference canceller, i.e. linear IC at chip level, provides an initial decision for the second interference canceller, i.e. linear/nonlinear IC at symbol level. In one aspect, in addition to the features described in FIG. 4, a third 16 point fast Hadamard transform (FHT) module accepts the first spread output signal of the first interference canceller. The output of the third FHT module is then sent to the cancel module of the second interference canceller.

Figure 6:
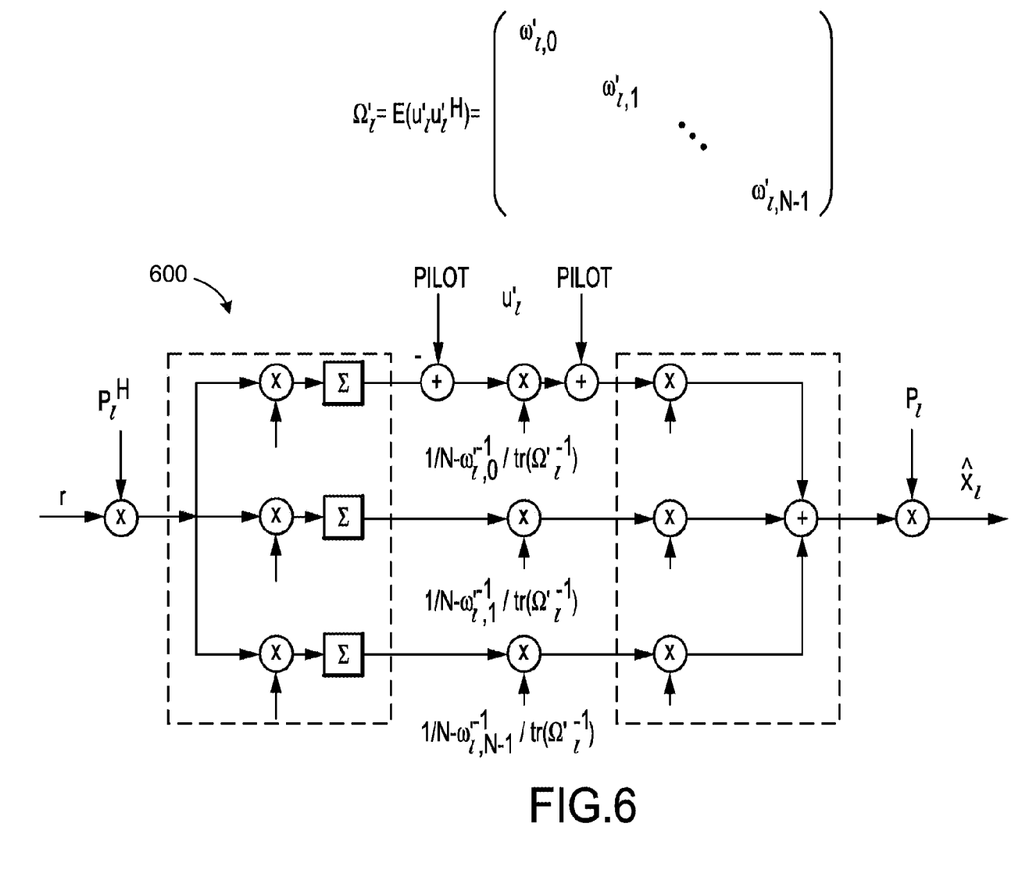

FIG. 6 illustrates an example of a symbol estimation module 600 for the symbol domain. In one aspect, the symbol estimation module takes a chip input after the channel matched filter (CMF) and adders, applies symbol processing and yields a chip output corresponding to $\hat{t}(n)$ in FIG. 3. Thus, in one example, it includes descrambling, despreading, symbol scaling, spreading and scrambling operations. In FIG. 6, the first multiply implements the descrambling operation. The multiply operations and summer operations which follow in each branch perform a dispreading operation, for example, by a FHT. Next, the symbol scaling operation for each OVSF code is performed using quasi-linear interference cancellation (QLIC) scaling, for example. In one aspect, for the pilot symbol, instead of using an estimated scaled pilot, a true scaled pilot may be used, as illustrated. The subsequent multiplies for all branches are used for the spreading operation and may be implemented, for example, by a IFHT. Finally, the last multiply is used for the scrambling operation.

Figure 7:
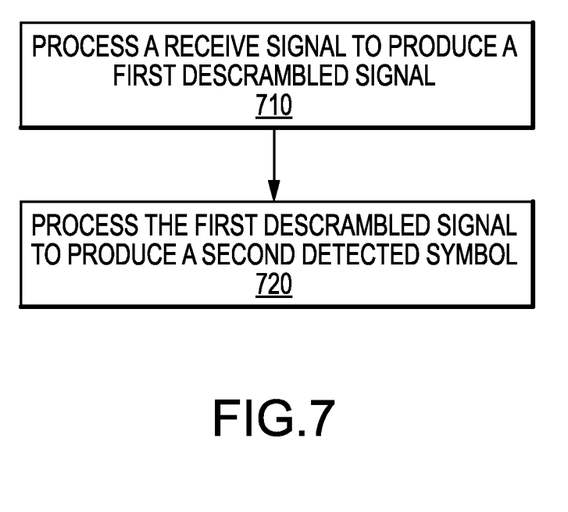

FIG. 7 illustrates an example flow diagram for a two-stage linear/nonlinear interference cancellation. In block 710, process a receive signal to produce a first descrambled signal. In one aspect, a first interference canceller module is used for the processing. In one example, the first interference canceller is a linear interference canceller (IC). In another aspect, the first interference canceller operates at a chip level. In block 720, process the first descrambled signal to produce a second detected signal. In one aspect, the processing in block 720 is performed using a second interference canceller module. In one example, the second interference canceller is a linear/nonlinear interference canceller (IC). In another aspect, the second interference canceller operates at a symbol level.

One skilled in the art would understand that the steps disclosed in the example flow diagram in FIG. 7 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 8:
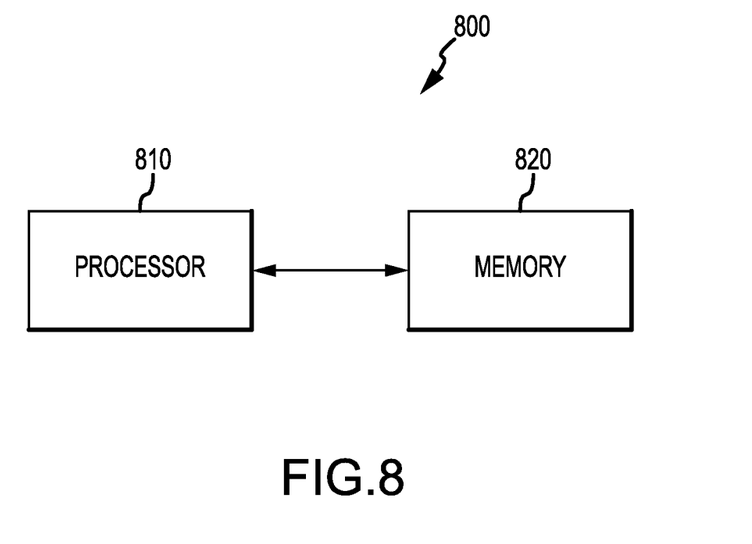

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 8 illustrates an example of a device 800 comprising a processor 810 in communication with a memory 820 for executing the processes for a two-stage linear/nonlinear interference cancellation. In one example, the device 800 is used to implement the algorithm illustrated in FIG. 7. In one aspect, the memory 820 is located within the processor 810. In another aspect, the memory 820 is external to the processor 810. In one aspect, the processor includes circuitry for implementing or performing the various flow diagrams, logical blocks and/or modules described herein.

Figure 9:
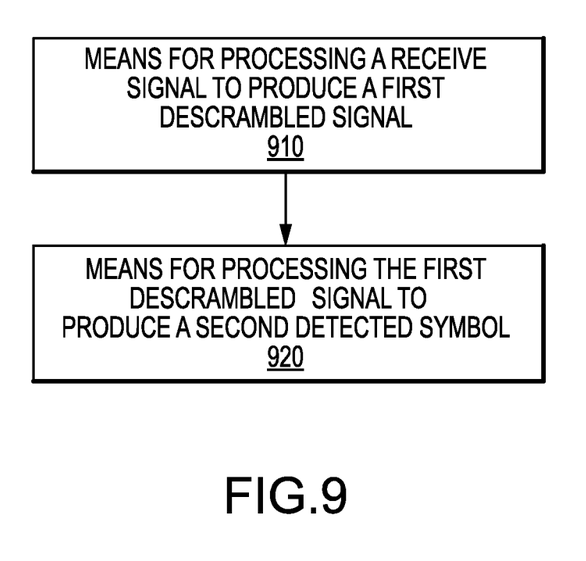

FIG. 9 illustrates an example of a device 900 suitable for a two-stage linear/nonlinear interference cancellation. In one aspect, the device 900 is implemented by at least one processor comprising one or more modules configured to provide different aspects of a two-stage linear/nonlinear interference cancellation as described herein in blocks 910 and 920. For example, each module comprises hardware, firmware, software, or any combination thereof. In one aspect, the device 900 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for performing a two-stage interference cancellation in a wireless communication system, comprising:
cancelling from a receive signal, in a first stage interference cancellation, an estimated interference signal generated from an estimated transmit signal;
channel match filtering the interference canceled receive signal using a channel match filter to produce an intermediate signal;
combining the intermediate signal with the estimated transmit signal to produce a modified filtered signal;
multiplying the modified filtered signal with a conjugate pseudonoise sequence of a given cell to produce a first descrambled signal;
generating the estimated transmit signal for a next iteration of the first stage interference cancellation from the first descrambled signal; and
processing, in a second stage interference cancellation, the first descrambled signal using a detect multi-user transmission module and a re-detect multi-user transmission module to produce a detected signal;
wherein the detect multi-user transmission module employs a multi-user interference matrix that relates each received symbol to a corresponding user symbol and other user symbols.

2. The method of claim 1 wherein a first interference canceller is used in the first stage interference cancellation for the cancelling and the channel match filtering and the combining and the multiplying and the generating, and a second interference canceller is used in the second stage interference cancellation for processing the first descrambled signal.

3. The method of claim 2 wherein the first interference canceller is a linear interference canceller (IC) and wherein the generating the estimated transmit signal further comprises scaling a despread signal generated from the first descramble signal to produce the estimated transmit signal.

4. The method of claim 3 wherein the second interference canceller is a linear/nonlinear interference canceller (IC).

5. The method of claim 2 wherein the first interference canceller operates at a chip level.

6. The method of claim 2 wherein the second interference canceller is a linear/nonlinear interference canceller (IC).

7. The method of claim 2 wherein the second interference canceller operates at a symbol level.

8. The method of claim 2 wherein the first interference canceller operates at a chip level and the second interference canceller operates at a symbol level.

9. An apparatus for a two-stage interference cancellation, comprising:
at least one processor, wherein the at least one processor includes:
a signal canceller configured to cancel from a receive signal, in a first stage interference cancellation, an estimated interference signal generated from an estimated transmit signal;
a channel match filter configured to filter the interference canceled receive signal to produce an intermediate signal;
a signal combiner configured to combine the intermediate signal with the estimated transmit signal to produce a modified filtered signal;
a multiplier configured to multiply the modified filtered signal with a conjugate pseudonoise sequence of a given cell to produce a first descrambled signal;

a symbol estimation module configured to generate the estimated transmit signal for a next iteration of the first stage interference cancellation from the first descrambled signal; and a detect multi-user transmission module and a re-detect multi-user transmission module configured to process, in a second stage interference cancellation, the first descrambled signal to produce a detected signal;

wherein the detect multi-user transmission module is configured to use a multi-user interference matrix that relates each received symbol to a corresponding user symbol and other user symbols.

10. The apparatus of claim 9 wherein the signal canceller and the channel match filter and the signal combiner and the multiplier and the symbol estimation module are within a first interference canceller in the first stage interference cancellation, and the detect multi-user transmission module and the re-detect multi-user transmission module are within a second interference canceller in the second stage interference cancellation.

11. The apparatus of claim 10 wherein the first interference canceller is a linear interference canceller (IC) and the symbol estimation module is further configured to scale a despread signal generated from the first descramble signal to produce the estimated transmit signal.

12. The apparatus of claim 11 wherein the second interference canceller is a linear/nonlinear interference canceller (IC).

13. The apparatus of claim 10 wherein the first interference canceller operates at a chip level.

14. The apparatus of claim 10 wherein the second interference canceller is a linear/nonlinear interference canceller (IC).

15. The apparatus of claim 10 wherein the second interference canceller operates at a symbol level.

16. The apparatus of claim 10 wherein the first interference canceller operates at a chip level and the second interference canceller operates at a symbol level.

17. An apparatus for performing a two-stage interference cancellation in a wireless communication system, comprising:

means for cancelling from a receive signal, in a first stage interference cancellation, an estimated interference signal generated from an estimated transmit signal;

means for channel match filtering the interference canceled receive signal to produce an intermediate signal;

means for combining the intermediate signal with the estimated transmit signal to produce a modified filtered signal;

means for multiplying the modified filtered signal with a conjugate pseudonoise sequence of a given cell to produce a first descrambled signal;

means for generating the estimated transmit signal for a next iteration of the first stage interference cancellation from the first descrambled signal; and means for processing, in a second stage interference cancellation, the first descrambled signal using a detect multi-user transmission module and a re-detect multi-user transmission module to produce a detected signal;

wherein the detect multi-user transmission module is configured to use a multi-user interference matrix that relates each received symbol to a corresponding user symbol and other user symbols.

18. The apparatus of claim 17 wherein a first interference canceller is used in the first stage interference cancellation for the means for cancelling and the means for channel match filtering and the means for combining and the means for the multiplying and the means for generating, and a second interference canceller is used in the second stage interference cancellation for the means for processing the first descrambled signal.

19. The apparatus of claim 18 wherein the first interference canceller is a linear interference canceller (IC) and wherein the means for generating further comprises means for scaling a despread signal generated from the first descramble signal to produce the estimated transmit signal.

20. The apparatus of claim 19 wherein the second interference canceller is a linear/nonlinear interference canceller (IC).

21. The apparatus of claim 18 wherein the first interference canceller operates at a chip level.

22. The apparatus of claim 18 wherein the second interference canceller is a linear/nonlinear interference canceller (IC).

23. The apparatus of claim 18 wherein the second interference canceller operates at a symbol level.

24. The apparatus of claim 18 wherein the first interference canceller operates at a chip level and the second interference canceller operates at a symbol level.

25. A non-transitory computer-readable medium for a two-stage interference cancellation, the non-transitory computer-readable medium storing a computer program, wherein the computer program comprises code for:

cancelling from a receive signal, in a first stage interference cancellation, an estimated interference signal generated from an estimated transmit signal;

channel match filtering the interference canceled receive signal using to produce an intermediate signal;

combining the intermediate signal with the estimated transmit signal to produce a modified filtered signal;

multiplying the modified filtered signal with a conjugate pseudonoise sequence of a given cell to produce a first descrambled signal;

generating the estimated transmit signal for a next iteration of the first stage interference cancellation from the first descrambled signal; and processing, in a second stage interference cancellation, the first descrambled signal using a detect multi-user transmission module and a re-detect multi-user transmission module to produce a detected signal;

wherein the detect multi-user transmission module is configured to use a multi-user interference matrix that relates each received symbol to a corresponding user symbol and other user symbols.

26. The non-transitory computer-readable medium of claim 25 wherein a first interference canceller is used in the first stage interference cancellation for the cancelling and the channel match filtering and the combining and the multiplying and the generating, and a second interference canceller is used in the second stage interference cancellation for processing the first descrambled signal.

27. The non-transitory computer-readable medium of claim 26 wherein the first interference canceller is a linear interference canceller (IC) and wherein the code for generating further comprises code for scaling a despread signal generated from the first descramble signal to produce the estimated transmit signal.

28. The non-transitory computer-readable medium of claim 27 wherein the second interference canceller is a linear/nonlinear interference canceller (IC).

29. The non-transitory computer-readable medium of claim 26 wherein the first interference canceller operates at a chip level.

30. The non-transitory computer-readable medium of claim 26 wherein the second interference canceller is a linear/nonlinear interference canceller (IC).

31. The non-transitory computer-readable medium of claim 26 wherein the second interference canceller operates at a symbol level.

32. The non-transitory computer-readable medium of claim 26 wherein the first interference canceller operates at a chip level and the second interference canceller operates at a symbol level.

* * * * *